United States Patent
Kim

(10) Patent No.: US 9,368,769 B2
(45) Date of Patent: Jun. 14, 2016

(54) BATTERY PACK

(75) Inventor: Taeyong Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 219 days.

(21) Appl. No.: 12/889,266

(22) Filed: Sep. 23, 2010

(65) Prior Publication Data
US 2011/0293978 A1    Dec. 1, 2011

(30) Foreign Application Priority Data
May 31, 2010 (KR) ......................... 10-2010-0051137

(51) Int. Cl.
*H01M 2/10* (2006.01)
*H01M 2/02* (2006.01)
*H01M 10/04* (2006.01)

(52) U.S. Cl.
CPC .......... *H01M 2/1077* (2013.01); *H01M 2/0207* (2013.01); *H01M 10/0413* (2013.01); *H01M 10/0445* (2013.01)

(58) Field of Classification Search
CPC ... H01M 2/1077; H01M 2/20; H01M 2/1022; H01M 2/1016
USPC ............................................ 429/98, 99, 100
See application file for complete search history.

(56) References Cited

U.S. PATENT DOCUMENTS

| | | | |
|---|---|---|---|
| 3,623,917 A * | 11/1971 | Chassoux | 429/99 |
| 5,492,779 A | 2/1996 | Ronning | |
| 5,756,227 A | 5/1998 | Suzuki et al. | |
| 2005/0208375 A1 | 9/2005 | Sakurai | |
| 2006/0115719 A1 * | 6/2006 | Jeon et al. | 429/156 |
| 2009/0142628 A1 | 6/2009 | Okada et al. | |
| 2010/0000816 A1 | 1/2010 | Okada | |
| 2010/0178553 A1 | 7/2010 | Murata | |
| 2011/0294000 A1 | 12/2011 | Kim et al. | |

FOREIGN PATENT DOCUMENTS

| | | | |
|---|---|---|---|
| CN | 1783539 A | 6/2006 | |
| CN | 201311951 Y | 9/2009 | |
| EP | 1 577 966 A2 | 9/2005 | |
| EP | 1577966 * | 9/2005 | H01M 2/02 |
| GB | 482363 * | 3/1938 | |
| GB | 1 488 116 | 10/1977 | |

(Continued)

OTHER PUBLICATIONS

Extended European Search Report dated Apr. 19, 2011, corresponding to EP Application No. 10194501.2, 5 pages.

(Continued)

*Primary Examiner* — Barbara Gilliam
*Assistant Examiner* — Angela Martin
(74) *Attorney, Agent, or Firm* — Lewis Roca Rothgerber Christie LLP

(57) ABSTRACT

A battery pack including a frame integrated with a reinforcement member and a supporting member, thereby realizing a compact and lightweight dimension. The battery pack includes a plurality of battery cells stacked on top of each other, a frame including a supporting member covering the plurality of battery cells and a reinforcement member formed inside the supporting member, and an end plate disposed at the exterior of the plurality of battery cells and coupled to the frame.

18 Claims, 5 Drawing Sheets

(56) References Cited

FOREIGN PATENT DOCUMENTS

| JP | 2005-268004 | | 9/2005 | |
|----|-------------|---|--------|---|
| JP | 2008-192377 | | 8/2008 | |
| JP | 2009-134938 | | 6/2009 | |
| JP | 2009-238643 | | 10/2009 | |
| JP | 2010-015949 | | 1/2010 | |
| JP | 2010-108788 | | 5/2010 | |
| JP | 2011-023266 | | 2/2011 | |
| JP | 2011-249315 | * | 12/2011 | ............. H01M 2/10 |

OTHER PUBLICATIONS

Japanese Office action dated Dec. 18, 2012, for corresponding Japanese Patent application 2010-214109, (2 pages).

Patent Abstracts of Japan, and English machine translation of Japanese Publication 2011-023266 listed above, (11 pages).

SIPO Office action dated Jun. 9, 2013, with English translation, for corresponding Chinese Patent application 201010562900.7, (22 pages).

JPO Notice of Allowance dated Aug. 13, 2013, for corresponding Japanese Patent application 2010-214109, (3 pages).

Patent Abstracts of Japan, and English machine translation of Japanese Publication 2009-238643 dated Oct. 15, 2009, listed above, (16 pages).

Patent Abstracts of Japan, and English machine translation of Japanese Publication 2010-108788 dated May 13, 2010, listed above, (16 pages).

\* cited by examiner

BATTERY PACK

CROSS-REFERENCE TO RELATED APPLICATION

This application claims priority to and the benefit of Korean Patent Application No. 10-2010-0051137, filed on May 31, 2010, the entire content of which is incorporated herein by reference.

BACKGROUND

1. Field

The present invention relates to a battery pack.

2. Description of the Related Art

In general, secondary batteries are capable of being charged and discharged and can be repeatedly used. Low-capacity secondary batteries, each including a single unit cell, are widely used in small portable electronic devices, such as mobile phones, notebook type computers, cameras, camcorders, and the like. On the other hand, large-capacity secondary batteries, each including multiple battery cells, may be used as motor driving power sources, such as a hybrid electric vehicle (HEV), an electric vehicle (EV), an electric scooter, or the like.

A battery pack includes various components including a plurality of battery cells, fixing members, a case, and so on. However, these components may impede attainment of compact and lightweight battery packs.

SUMMARY

According to one or more embodiments of the present invention, a battery pack includes a frame integrated with a reinforcement member and a supporting member, thereby providing a compact and lightweight dimension of the battery pack.

One embodiment of the present invention provides a battery pack including a plurality of battery cells stacked together; a frame comprising a supporting member covering the battery cells and a reinforcement member within the supporting member; and an end plate on the battery cells and coupled to the frame.

In one embodiment, the supporting member and the reinforcement member are made from different materials and are insert molded to each other. For example, the supporting member may be made from an insulating resin and the reinforcement member may be made from a metallic material. Further, a portion of the reinforcement member may protrude from the supporting member and extend through the end plate.

In one embodiment, the supporting member includes a bottom portion covering one side of each of the plurality of battery cells; and a sidewall portion bent and extending from at least two sides of the bottom portion and covering two sides of each of the battery cells. The reinforcement member may be located in the sidewall portion and may include a base portion comprising a bar and extending in a direction generally parallel to a direction in which the battery cells are stacked; an extending portion extending from the base portion and protruding from the supporting member and passing through the end plate; and a screw thread on the extending portion.

In one embodiment, the reinforcement member includes a plurality of coupling grooves and wherein the plurality of coupling grooves contain the supporting member. In another embodiment, the reinforcement member includes a plurality of coupling protrusions protruding from an outer surface of the reinforcement member. Further, the end plate may include a plate portion facing the plurality of battery cells and having an opening, wherein the reinforcement member extends through the opening; and a bent portion bent from and extending from two sides of the plate portion.

As described above, the battery pack according to the embodiments of the present invention includes a frame having a reinforcement member and a supporting member coupled to each other by, for example, insert molding, thereby simplifying the manufacturing process and minimizing a size of the battery pack.

In addition, the battery pack according to the embodiments of the present invention includes a reinforcement member and a supporting member made of different materials, thereby dispersing stress applied due to an external force.

Further, the battery pack according to the embodiments of the present invention includes a reinforcement member made of a metallic material and a supporting member made of an insulating resin, thereby increasing mechanical strength, maintaining the shape and minimizing size while improving a heat dissipation capability and an insulating capability.

Additional aspects of the invention will be set forth in part in the description that follows.

BRIEF DESCRIPTION OF THE DRAWINGS

The objects, features and advantages of the present invention will be more apparent from the following detailed description in conjunction with the accompanying drawings, in which.

DETAILED DESCRIPTION

Hereinafter, embodiments of the present invention will be described in detail with reference to the accompanying drawings.

Figure 1:
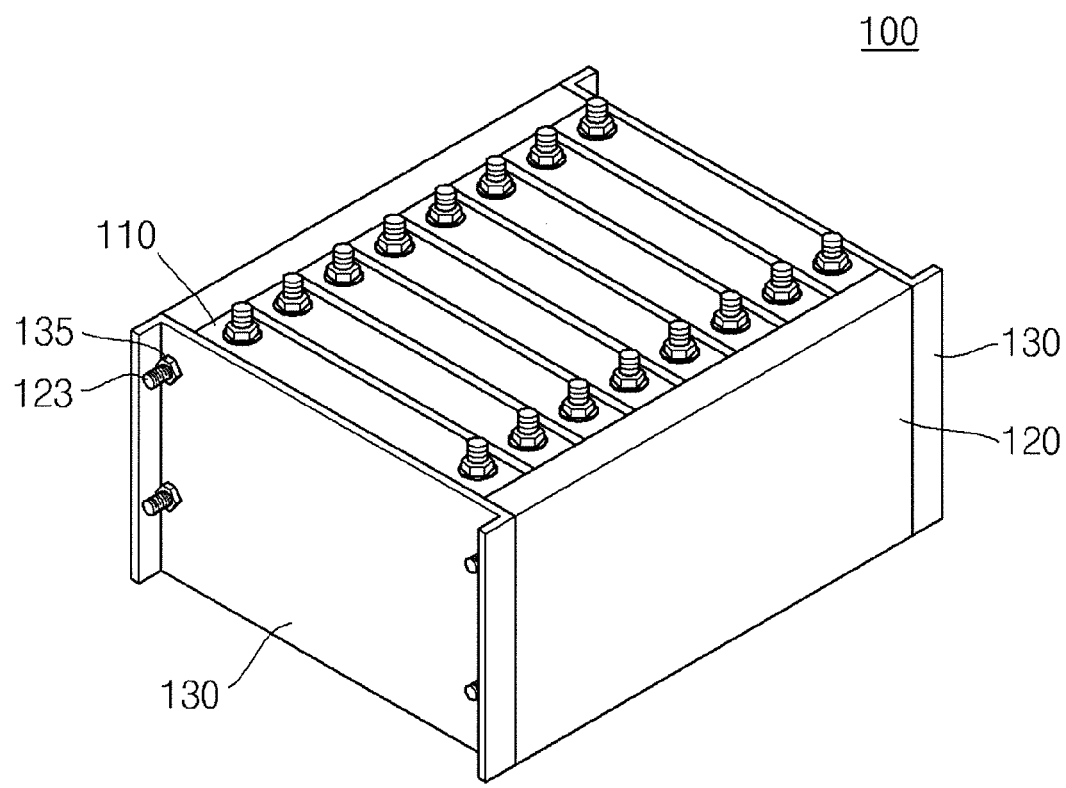
FIG. 1 is a perspective view of a battery pack according to an embodiment of the present invention.
Figure 2:
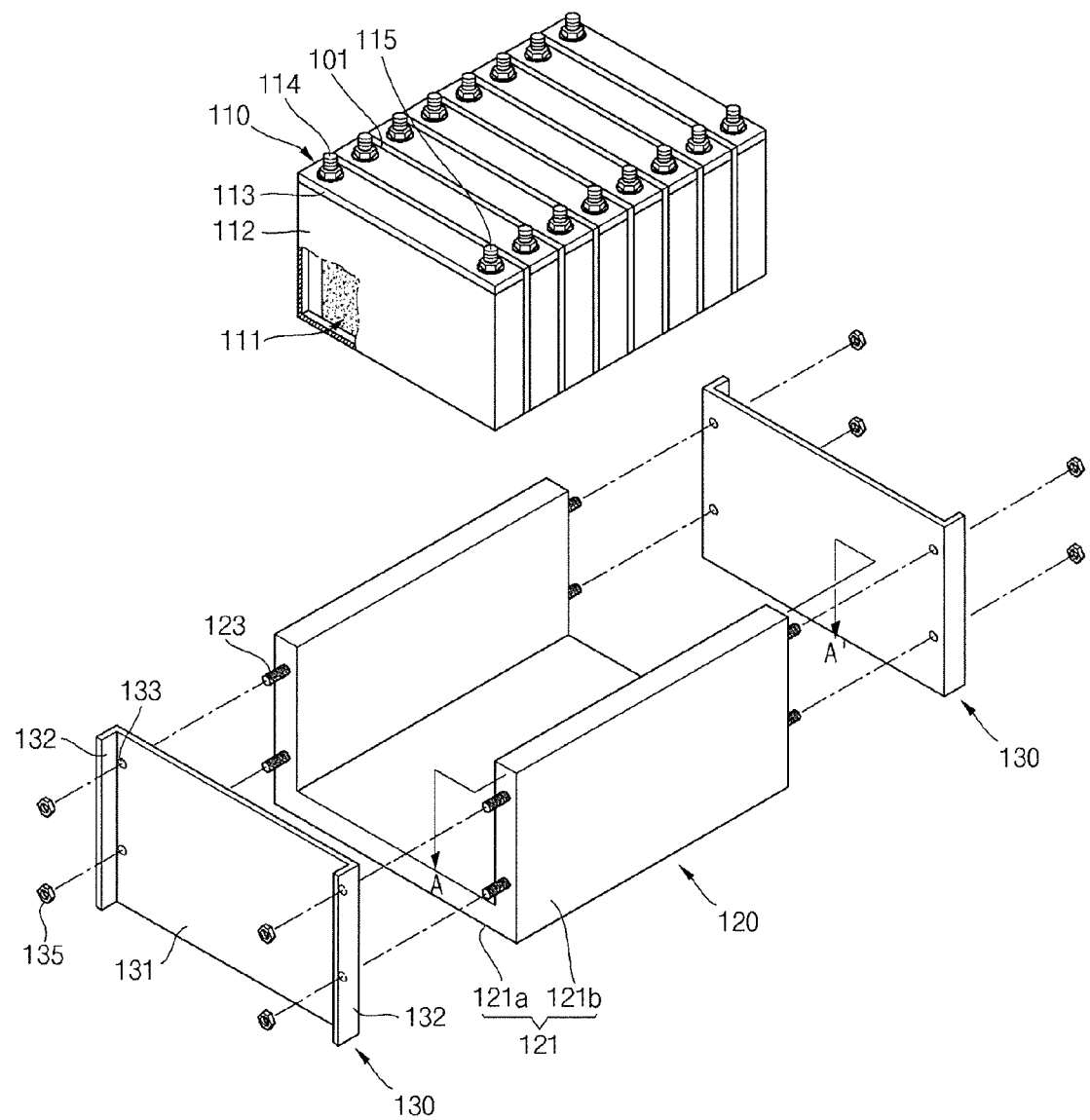
FIG. 2 is an exploded perspective view of the battery pack shown in FIG. 1.
Figure 3:
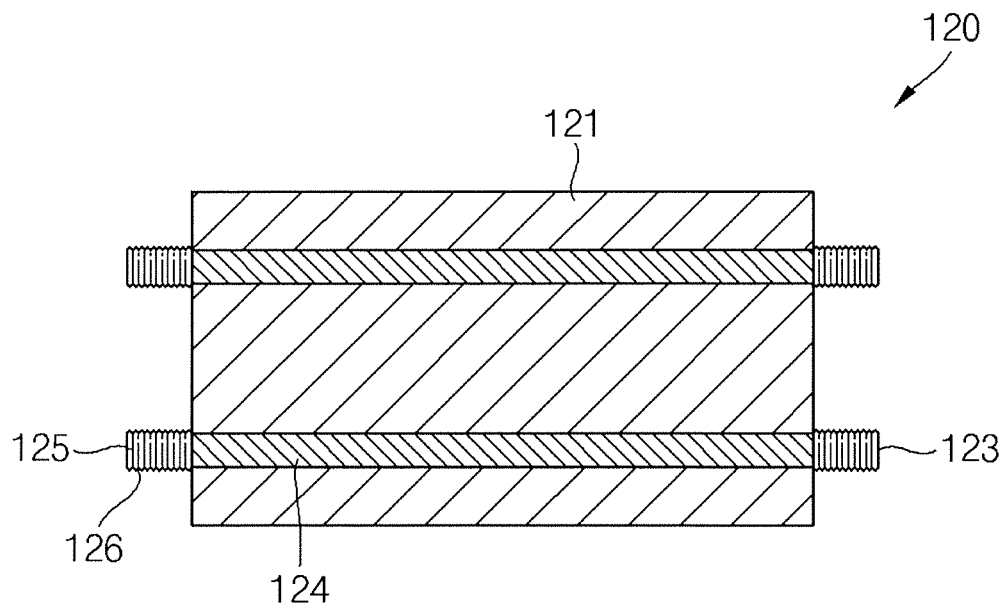
FIG. 3 is a cross-sectional view taken along the line A-A' of FIG. 2.

FIG. 1 is a perspective view of a battery pack according to an embodiment of the present invention, FIG. 2 is an exploded perspective view of the battery pack shown in FIG. 1, and FIG. 3 is a cross-sectional view taken along the line A-A' of FIG. 2.

Referring to FIGS. 1 and 2, the battery pack 100 according to an embodiment of the present invention includes a plurality of battery cells 110, a frame 120 and an end plate 130.

The plurality of battery cells 110 may be stacked together, and are connected to each other in series or parallel by an electrical connection member. The plurality of battery cells 110 are configured to be connected or coupled to external electronic devices and to perform discharge operations for supplying power to the external electronic devices or charge operations for receiving power from the external electronic devices.

Each of the plurality of battery cells 110 includes an electrode assembly 111 having a positive electrode plate and a negative electrode plate with a separator located therebetween, a case 112 providing for a space in which the electrode assembly 111 is housed, a cap assembly 113 coupled to the case 112 to hermetically sealing the case 112, and a positive electrode terminal 114 and a negative electrode terminal 115 electrically connected to the positive electrode plate and the negative electrode plate, respectively, and protruding from the cap assembly 113. Here, an insulator 101 having a relatively small thickness may be located between two adjacent battery cells 110 to prevent an unnecessary short-circuit. In addition, a thin insulator 101 may be attached to an outer surface of the outermost batter cell of the plurality of battery cells 110. In the following description of the current embodiment, a direction in which the positive electrode terminal 114 and the negative electrode terminal 115 are exposed from the battery cell 110 is referred to as an upper direction.

The frame 120 is formed to cover the plurality of battery cells 110, and to fix the plurality of battery cells 110 and protect the same from external impact. The frame 120 includes a supporting member 121 and a reinforcement member 123 coupled to each other by, for example, insert molding. Here, the insert molding is a technique of combining components made of two different materials into one body.

The supporting member 121 forms the external appearance of the frame 120. Specifically, the supporting member 121 includes a bottom portion 121a covering the bottom portion of the plurality of battery cells 110, and a sidewall portion 121b bent and extending from both sides of the bottom portion 121a to cover both sides of the plurality of battery cells 110. The supporting member 121 serves to support the shape of the frame 120. To this end, the supporting member 121 may be made of an insulating resin that is substantially indeformable.

The reinforcement member 123 is formed within the supporting member 121 and serves to reinforce the strength of the frame 120. To this end, the reinforcement member 123 may be made of a metal having high strength, for example, stainless steel. Here, the reinforcement member 123 may be at least one restraint rod positioned at the sidewall portion 121b of the supporting member 121. A portion of the reinforcement member 123 is exposed from the supporting member 121 to then pass through the end plate 130.

In detail, as shown in FIG. 3, the reinforcement member 123 includes a base portion 124, an extending portion 125, and a screw thread 126. FIG. 3 shows a portion of the sidewall portion 121b of the supporting member 121, in which the reinforcement member 123 is positioned. The base portion 124 is a bar extends in a direction substantially parallel to a direction in which the plurality of battery cells 110 are stacked. The extending portion 125 extends from the base portion 124 so as to be exposed from the supporting member 121 and passes through the end plate 130. The screw thread 126 is formed on the outer surface of the extending portion 125 and allows the nut 135 to be fastened with the extending portion 125.

As described above, the frame 120 is formed such that the supporting member 121 and the reinforcement member 123 are coupled to each other by, for example, insert molding, thereby simplifying the manufacturing process of the battery pack 100 and achieving a compact dimension of the battery pack 100. In addition, since the supporting member 121 and the reinforcement member 123 of the frame 120 are formed using different materials, the stress applied to the battery pack 100 can be dispersed. Further, since the reinforcement member 123 is made of a metallic material and the supporting member 121 is made of an insulating resin, the frame 120 may improve the heat dissipation capability and the insulating capability of the battery pack 100. Further, compared to a frame made of only a resin, the frame 120 of the embodiments of the present invention may have increased mechanical strength and is capable of maintaining the shape of the battery pack 100 while minimizing a weight of the battery pack 100, unlike a frame made of only a metal.

With reference again to FIG. 2, the end plate 130 is formed to cover exterior sides of the plurality of battery cells 110, specifically, both sides that are not covered by the frame 120, and is coupled to the frame 120 to then be fixed. The end plate 130 fixes the plurality of battery cells 110 together with the frame 120. The end plate 130 may be made of a metal or a resin, and may include a plate portion 131, a bent portion 132, and a throughhole or opening 133.

The plate portion 131 faces and covers the battery cell 110 and is coupled to the frame 120.

The bent portion 132 is bent and extends from both edges of the plate portion 131. The bent portion 132 reinforces the mechanical strength of the end plate 130, thereby preventing the end plate 130 from being significantly bent due to an external force.

The throughhole 133 is formed at a region of the plate portion 131 generally corresponding to the extending portion 125 of the reinforcement member 123, and the extending portion 125 of the reinforcement member 123 is inserted into the throughhole 133.

The end plate 130 is fixedly coupled to the frame 120 such that the extending portion 125 of the reinforcement member 123 is inserted into the throughhole 133 of the end plate 130 and the nut 135 is fastened with the extending portion 125 through the screw thread 126 of the reinforcement member 123.

As described above, the battery pack 100 according to the embodiment of the present invention includes the frame 120 having the supporting member 121 and the reinforcement member 123 coupled to each other by, for example, insert molding, thereby simplifying the manufacturing process thereof while minimizing a size of the battery pack.

In addition, in the battery pack 100 according to the embodiment of the present invention, since the supporting member 121 and the reinforcement member 123 are formed using different materials, the stress applied due to an external force can be dispersed.

Further, in the battery pack 100 according to the embodiment of the present invention, because the supporting member 121 is made of an insulating resin and the reinforcement member 123 is made of a metallic material, the heat dissipation capability and the insulating capability of the battery pack 100 can be improved, and shape maintaining capability and minimized weight of the battery pack 100 can also be achieved while increasing mechanical strength of the battery pack 100.

A battery pack corresponding to FIG. 4, according to another embodiment of the present invention will now be described.

Figure 4:
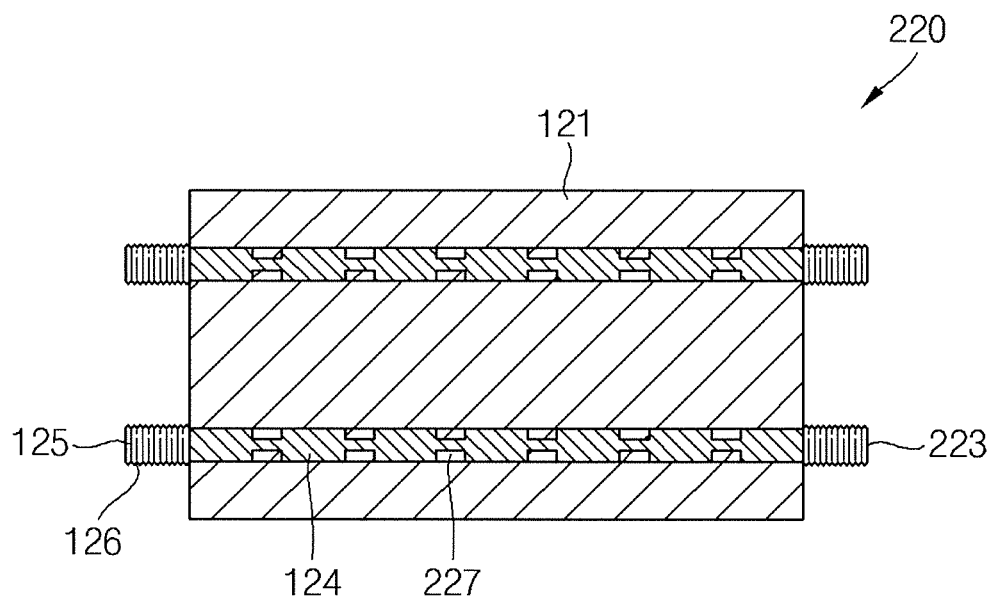
FIG. 4 is a cross-sectional view illustrating a part of a battery pack corresponding to FIG. 3, according to another embodiment of the present invention.

FIG. 4 is a cross-sectional view illustrating a part of a battery pack generally corresponding to FIG. 3, according to another embodiment of the present invention.

The battery pack according to this embodiment is substantially the same as the battery pack 100 according to the previous embodiment in view of configuration and function, except for the shape of a reinforcement member 223 of a frame 220, and therefore a description of the similar components will be omitted. In the following, the battery pack according to this embodiment will be described with regard to the reinforcement member 223 of the frame 220.

Referring to FIG. 4, the frame 220 is formed by coupling a supporting member 121 and the reinforcement member 223 to each other by, for example, insert molding.

The reinforcement member 223 is substantially the same as the reinforcement member 123 shown in FIG. 3, except that it further includes a plurality of coupling grooves 227 formed on the outer surface of a base portion 124. The plurality of coupling grooves 227 allow the supporting member 121 to be filled to be securely fixed.

As described above, the battery pack according to the embodiment further includes the plurality of coupling grooves 227 formed in the reinforcement member 223, thereby increasing coupling strength between the reinforcement member 223 and the supporting member 121 made of different materials.

A battery pack according to still another embodiment of the present invention will now be described.

Figure 5:
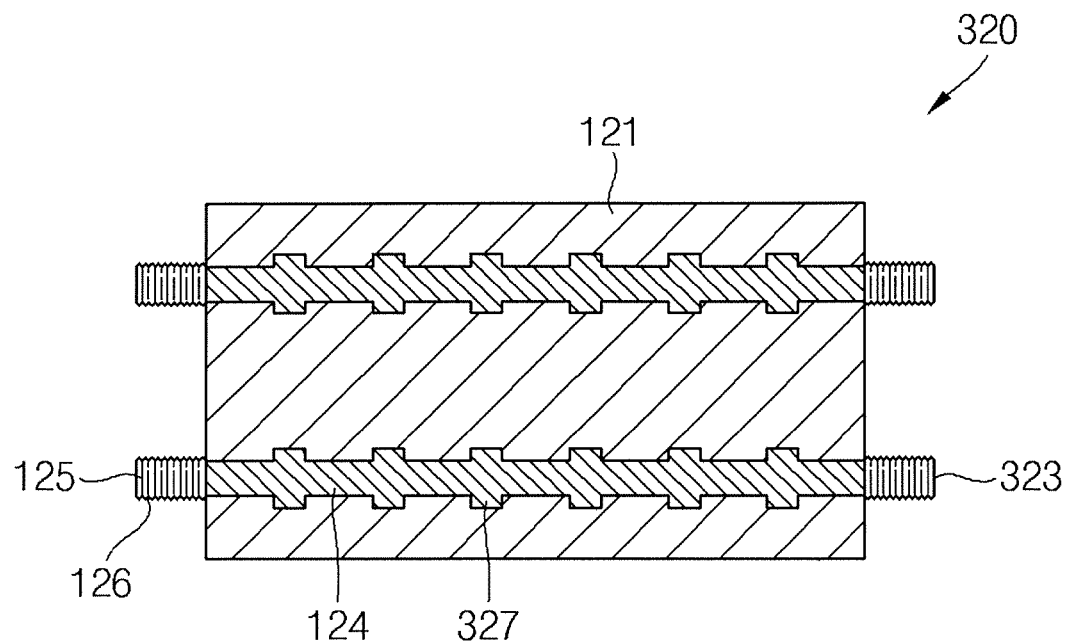
FIG. 5 is a cross-sectional view illustrating a part of a battery pack corresponding to FIG. 3, according to still another embodiment of the present invention.

FIG. 5 is a cross-sectional view illustrating a part of a battery pack according to still another embodiment of the present invention, the part corresponding to FIG. 3.

The battery pack according to this embodiment is substantially the same with the battery pack 100 according to the previous embodiment in view of configuration and function, except for the shape of a reinforcement member 323 of a frame 320, and a description of the similar components will be omitted. In the following, the battery pack according to this embodiment will be described with regard to the reinforcement member 323 of the frame 320.

Referring to FIG. 5, the frame 320 is formed by coupling a supporting member 121 and the reinforcement member 323 to each other by, for example, insert molding.

The reinforcement member 323 is substantially the same as the reinforcement member 123 shown in FIG. 3, except that it further includes a plurality of coupling protrusions 327 formed on the outer surface of a base portion 124. The plurality of coupling protrusions 327 serve as supporters resisting against external forces while increasing coupling strength between the reinforcement member 323 and the supporting member 121 made of different materials.

As described above, the battery pack according to the embodiment further includes the plurality of coupling protrusions 327 formed in the reinforcement member 323, thereby further increasing coupling strength between the reinforcement member 323 and the supporting member 121 made of different materials and increasing resistance against external forces.

Next, a battery pack according to still another embodiment of the present invention will be described.

Figure 6:
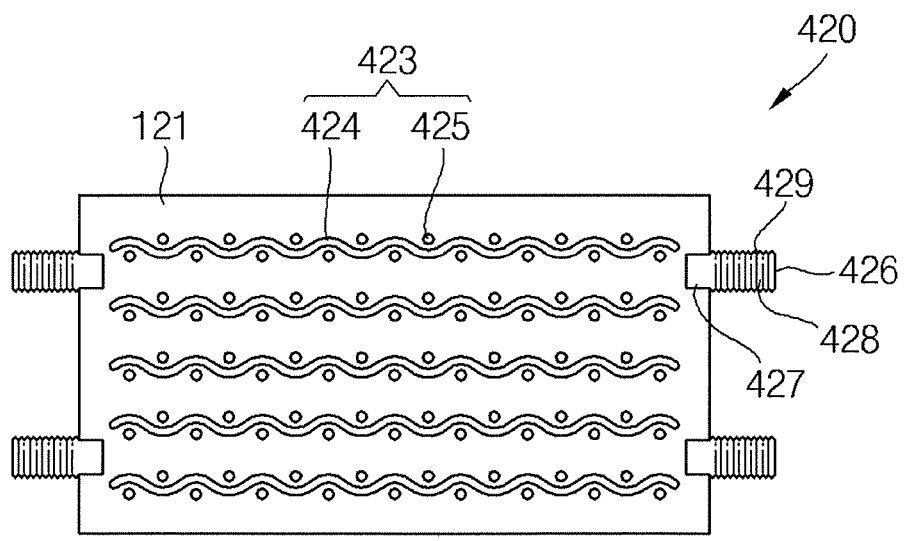
FIG. 6 is a cross-sectional view illustrating a part of a battery pack corresponding to FIG. 3, according to still another embodiment of the present invention.
Figure 7:
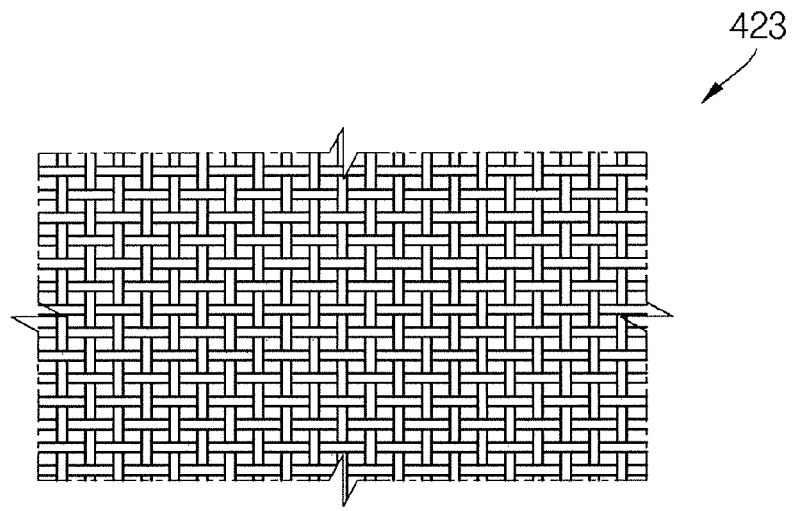
FIG. 7 is a plan view illustrating a reinforcement member shown in FIG. 6.

FIG. 6 is a cross-sectional view illustrating a part of a battery pack according to still another embodiment of the present invention, the part corresponding to FIG. 3, and FIG. 7 is a plan view illustrating a reinforcement member shown in FIG. 6.

The battery pack according to this embodiment is substantially the same with the battery pack 100 according to the previous embodiment in view of configuration and function, except for the shape of a reinforcement member 423 of a frame 420, and a description of the similar components will be omitted. In the following, the battery pack according to this embodiment will be described with regard to the reinforcement member 423 of the frame 420, and a connection member 426.

Referring to FIGS. 6 and 7, the frame 420 is formed by coupling a supporting member 121, the reinforcement member 423 and the connection member 426 by, for example, insert molding.

The reinforcement member 423 is formed within the supporting member 121 and reinforces mechanical strength of the frame 420. To this end, the reinforcement member 423 may be made of a metal having high strength, for example, stainless steel. Here, the reinforcement member 423 may be formed in a mesh type. Specifically, the reinforcement member 423 includes a first metal line 424 and a second metal line 425. The reinforcement member 423 is formed throughout a sidewall portion of the supporting member 121, thereby further increasing mechanical strength of the frame 420.

The connection member 426 may be formed at a region corresponding to the throughhole 133 of the end plate (130 of FIG. 2) in the frame 420, and may be a bolt. The connection member 426 includes a base portion 427 formed outside the reinforcement member 423 within the supporting member 121, an extending portion 428 exposed to one side of the supporting member 121, and a screw thread 429 formed on the outer surface of the extending portion 428. The extending portion 428 of the connection member 426 is inserted into the throughhole 133 of the end plate 130 and a nut (135 of FIG. 2) is fastened with the extending portion 428 through the screw thread 429, thereby allowing the end plate 130 to be fixedly coupled to the frame 420.

As described above, the battery pack according to the embodiment includes the mesh-type reinforcement member 423 throughout the sidewall portion of the supporting member 121, thereby further increasing the mechanical strength of the frame 420 and ultimately further increasing resistance against external forces.

A battery pack according to still another embodiment of the present invention will now be described.

Figure 8:
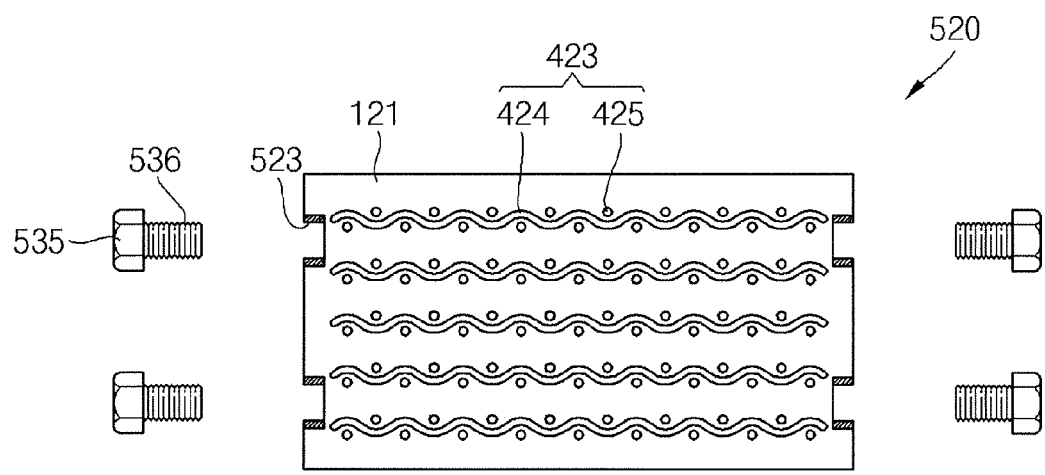
FIG. 8 is a cross-sectional view illustrating a part of a battery pack corresponding to FIG. 3, according to still another embodiment of the present invention.

FIG. 8 is a cross-sectional view illustrating a part of a battery pack according to still another embodiment of the present invention, the part generally corresponding to FIG. 3.

The battery pack according to this embodiment is substantially the same as the battery pack 100 according to the previous embodiment in view of configuration and function, except that the shape of a reinforcement member 423 of a frame 520, and a connection member 523 and a bolt 535 are further provided. As such, a description of the similar components will be omitted. In the following, the battery pack according to this embodiment will be described with regard to the reinforcement member 423 of the frame 520, the connection member 523 and the bolt 535.

Referring to FIG. 8, the frame 520 is formed by coupling a supporting member 121, the reinforcement member 423 and the connection member 523 to each other by, for example, insert molding.

Since the reinforcement member 423 is substantially the same as previously described with reference to FIG. 6, it will not be described again.

The connection member 523 may be formed at a region corresponding to the throughhole 133 of the end plate (130 of FIG. 2) in the frame 520, and may be a nut. The connection member 523 is formed outside the reinforcement member 423 within the supporting member 121 so as to be exposed from one side of the supporting member 121.

The bolt 535 includes a screw thread 536 formed on a portion of its outer surface, and passes through the throughhole 133 of the end plate (130 of FIG. 2) to then be fastened with the connection member 523, thereby allowing the frame 520 to be fixedly coupled to the end plate (130 of FIG. 2). Since the bolt 535 is used in coupling the frame 520 and the end plate (130 of FIG. 2), the nut 135 of FIG. 2 may be omitted.

As described above, the battery pack according to the embodiment includes the mesh-type reinforcement member 423 throughout the sidewall portion of the supporting member 121, thereby further increasing the mechanical strength of the frame 520 and ultimately further increasing resistance against external forces.

Although the battery pack according to the present invention has been illustrated through particular embodiments, it should be understood that many variations and modifications may be made in those embodiments within the scope of the present invention.

What is claimed is:

1. A battery pack comprising:
    a plurality of battery cells stacked together;
    a frame comprising a supporting member covering the battery cells and a reinforcement member within and directly contacting the supporting member, wherein the frame extends continuously along a length of all of the battery cells; and
    an end plate on the battery cells and coupled to the frame, wherein the supporting member comprises:
        a bottom portion covering one side of each of the plurality of battery cells; and
        a sidewall portion bent and extending from at least two sides of the bottom portion and covering two sides of each of the battery cells, wherein a part of the reinforcement member is entirely within the sidewall portion and extends along an entire length of the supporting member.

2. The battery pack of claim 1, wherein the supporting member and the reinforcement member comprise different materials.

3. The battery pack of claim 1, wherein the supporting member and the reinforcement member are insert molded to each other.

4. The battery pack of claim 1, wherein the supporting member comprises an insulating resin.

5. The battery pack of claim 1, wherein the reinforcement member comprises a metallic material.

6. The battery pack of claim 1, wherein a portion of the reinforcement member protrudes from the supporting member and extends through the end plate.

7. The battery pack of claim 6, further comprising a nut on an exterior side of the end plate and coupled to the reinforcement member.

8. The battery pack of claim 1, wherein the reinforcement member is located in the sidewall portion.

9. The battery pack of claim 1, wherein the reinforcement member comprises:
    a base portion comprising a bar and extending in a direction generally parallel to a direction in which the battery cells are stacked;
    an extending portion extending from the base portion and protruding from the supporting member and passing through the end plate; and
    a screw thread on the extending portion.

10. The battery pack of claim 1, wherein the reinforcement member includes a plurality of coupling grooves and wherein the plurality of coupling grooves contain the supporting member.

11. The battery pack of claim 1, wherein the reinforcement member includes a plurality of coupling protrusions protruding from an outer surface of the reinforcement member.

12. The battery pack of claim 1, wherein the end plate comprises:
    a plate portion facing the plurality of battery cells and an opening, wherein the reinforcement member extends through the opening; and
    a bent portion bent from and extending from two sides of the plate portion.

13. The battery pack of claim 1, further comprising a connection member on the reinforcement member, wherein the connection member is coupled to the end plate.

14. The battery pack of claim 13, wherein the connection member is a bolt passing through the end plate, and wherein the battery pack further comprises a nut coupled to the connection member.

15. The battery pack of claim 13, wherein the connection member is a nut, and wherein the battery pack further comprises a bolt extending through the end plate and coupled to connection member.

16. The battery pack of claim 13, wherein the reinforcement member is a mesh type.

17. The battery pack of claim 16, wherein the reinforcement member comprises a first metal line and a second metal line.

18. The battery pack of claim 1, further comprising an insulator located between two adjacent battery cells among the plurality of battery cells.

* * * * *